United States Patent
Butt et al.

[11] Patent Number: 5,806,954
[45] Date of Patent: Sep. 15, 1998

[54] MOVING POINTER WITH EDGEWISE EL LAMP

[75] Inventors: James H. Butt, Mesa, Ariz.; Christopher C. Shol, Novi, Mich.; Robert J. Krafcik, Phoeniz; Edward L. Kinnally, Gilbert, both of Ariz.

[73] Assignee: Durel Corporation, Chandler, Ariz.

[21] Appl. No.: 540,058

[22] Filed: Oct. 6, 1995

Related U.S. Application Data

[63] Continuation of Ser. No. 310,428, Sep. 22, 1994, abandoned.

[51] Int. Cl.$^6$ .................................................. G01D 11/28
[52] U.S. Cl. ................................. 362/26; 362/23; 362/84
[58] Field of Search .................................. 362/23, 26, 84, 362/31; 116/284, 286, 287, 288, DIG. 6, DIG. 35, DIG. 36

[56] References Cited

U.S. PATENT DOCUMENTS

| | | | |
|---|---|---|---|
| 2,792,803 | 5/1957 | Hardesty | 116/DIG. 35 |
| 2,945,145 | 7/1960 | Neugass | 116/DIG. 35 |
| 3,066,643 | 12/1962 | Flanagan, Jr. | 116/288 |
| 3,071,105 | 1/1963 | Wertheimer | 116/286 |
| 3,094,970 | 6/1963 | Zargarpur | 116/129 |
| 3,219,008 | 11/1965 | Harris et al. | 116/286 |
| 4,215,647 | 8/1980 | Fukasawa | 116/DIG. 36 |
| 4,559,582 | 12/1985 | Scardilli et al. | 362/23 |
| 4,959,759 | 9/1990 | Kohler | 362/80 |
| 5,178,447 | 1/1993 | Murase et al. | 362/31 |
| 5,320,063 | 6/1994 | Ogura et al. | 116/288 |

FOREIGN PATENT DOCUMENTS

| | | | |
|---|---|---|---|
| 3259714 | 11/1991 | Japan | 362/23 |

*Primary Examiner*—Y. My Quach
*Attorney, Agent, or Firm*—Paul F. Wille

[57] ABSTRACT

A movable pointer includes an elongated, translucent substrate having an EL lamp covering one side of the substrate. The pointer emits light from an adjoining, narrower, front side which is roughened slightly. The ends of the substrate are capped or coated to prevent light emission. A second EL lamp can be attached to a second side of the substrate. The width of the EL lamp can be tapered to provide a pointer which is brighter at one end than at the other. Electrical connection to the EL lamp is made with a compliant ribbon having conductive stripes on one or both sides thereof. The ribbon is mechanically and electrically attached to contacts on the EL lamp.

12 Claims, 1 Drawing Sheet

MOVING POINTER WITH EDGEWISE EL LAMP

This application is a continuation of application Ser. No. 08/310,428, filed on Sep. 22, 1994, now abandoned.

BACKGROUND OF THE INVENTION

This invention relates to luminous pointers and, in particular, to a moving pointer including an electroluminescent (EL) lamp viewed edgewise.

The extreme variation in ambient light from day to night creates problems for makers of panel displays which must be clear and distinct under all lighting conditions. Natural and artificial lighting differ greatly not only in intensity but also in color. Artificial lighting "washes out", i.e. contributes nothing to the visibility of a panel, during daytime. At night or in low ambient light, a panel must be legible under artificial illumination.

Panels typically include light colored or white indicia on a dark or black background, or vice-versa, for the most legible displays. Artificially lit displays are typically backlit and include a translucent sheet having a mask with a suitable graphic, e.g. a scale and the name of the parameter being displayed. Such displays often include a translucent moving pointer optically coupled to an incandescent lamp, which makes the pointer seem luminous. The translucency of the display and of the pointer must not cause the display to be indistinct in natural light, i.e. the translucent portions must be sufficiently reflective for the display to be legible in bright ambient light.

An EL lamp is essentially a capacitor having a dielectric layer between two conductive electrodes, one of which is transparent. The dielectric layer includes a phosphor powder which radiates light in the presence of a strong electric field, using very little current. For EL lamps in the form of a flat panel, the front electrode is typically a thin, transparent layer of indium tin oxide or indium oxide and the rear electrode is typically a polymer binder, e.g. polyvinylidene fluoride (PVDF), polyester, vinyl, or epoxy, containing conductive particles such as silver or carbon. The front electrode is applied to a polymer film, such as polyester or polycarbonate, which provides mechanical integrity and support for the other layers.

An EL lamp has a distinct advantage in displays in that the phosphor of the lamp is both reflective and luminous. Another advantage of EL lamps is extremely low power consumption and heat generation. A problem with EL lamps is that an EL lamp is not as luminous as other types of lamps, e.g. an incandescent lamp.

Moving pointers including an EL lamp are known in the prior art. For example, U.S. Pat. No. 3,094,970 (Zargarpur) discloses a gauge having a moving pointer coated with EL phosphor. The electrical connection to the pointer is somewhat tortuous, including a watchspring for biasing the pointer to a rest position. It is unlikely that the pointer is very bright because the pointer is so narrow.

Translucent pointers are disclosed in U.S. Pat. No. 4,559,582 (Scardilli et al.) and in U.S. Pat. 4,959,759 (Kohler). In the Scardilli et al. patent, a one-piece, translucent member includes a pointer and an orthogonal shaft. The shaft is concentric within a cylindrical EL lamp located behind the faceplate of the gauge and light from the EL lamp is coupled by the shaft through the faceplate to the pointer. In the Kohler patent, an annular EL lamp is concentric with a shaft on which a translucent pointer is mounted. The base of the pointer is an enlarged, circular area for gathering light from the EL lamp.

In the Scardilli et al. patent, the EL lamp does not move and, therefore, making electrical connection to the lamp is relatively simple. In the Kohler patent, it is not clear whether or not the EL lamp moves and no connections to the lamp are described. Electrical connections to a moving pointer including an EL lamp are difficult to make reliably. The wires must be compliant to avoid affecting the positioning of the pointer, yet must be substantial enough to withstand repeated flexing as the pointer is moved.

In view of the foregoing, it is therefore an object of the invention to provide a moving pointer including an EL lamp in which the pointer is characterized by high luminosity in low ambient light conditions and high reflectivity in high ambient light conditions.

Another object of the invention is to provide a high compliance electrical connection to an EL lamp in a moving pointer.

SUMMARY OF THE INVENTION

The foregoing objects are achieved in this invention in which a pointer includes an elongated, translucent substrate in the shape of an elongated member with a cross-section having three or more sides and an EL lamp covering one side. The pointer emits light from an adjoining side of the substrate which faces a viewer, i.e. the adjoining side is the front side of the pointer. The front side of the substrate is roughened slightly to increase light emission. The EL lamp can include a taper to provide a pointer which is brighter at one end than at the other. The top and bottom ends of the substrate are capped or coated to prevent light emission or to provide internal reflection. In an alternative embodiment of the invention, EL lamps are attached to at least two sides of the substrate. In another alternative embodiment, fluorescent pigments or dyes are added to the substrate for high ambient light visibility or for color modification. Electrical connection to the EL lamp is made with a compliant ribbon having conductive stripes on one or both sides thereof. The ribbon is mechanically and electrically attached to contacts on the lamp.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
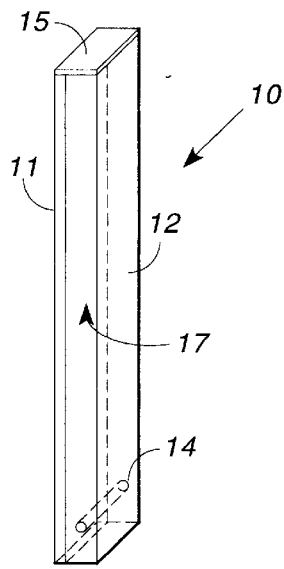
FIG. 1 illustrates a pointer constructed in accordance with a preferred embodiment of the invention.

FIG. 1 illustrates a pointer constructed in accordance with a preferred embodiment of the invention in which pointer 10 includes EL lamp 11 attached to translucent substrate 12. Lamp 11 is attached to substrate 12 with its transparent electrode facing the substrate for emitting light into the substrate. Lamp 11 is an elongated, rectangular sheet attached to substrate 12 which is an elongated member, preferably made from polycarbonate. The lower end of pointer 10 includes pivot 14 extending parallel to the plane of lamp 11 for attaching pointer 10 to a rotating shaft. The upper end of pointer 10 is covered by cap 15 which is preferably a reflective layer or an opaque layer for preventing light from escaping from the narrow end of substrate 12. The remaining sides of substrate 12 are also preferably covered by a reflective layer.

As illustrated in FIG. 1, substrate 12 has a rectangular cross-section and lamp 11 is attached to a broader side of the substrate. Front 17 is narrower and has a smaller area than lamp 11 and is preferably slightly roughened to increase the amount of light emanating from the front. The combination of edgewise EL lamp and translucent substrate provides a bright, narrow line with no unlit border, making pointer 10 useful in a variety of applications.

Figure 2:
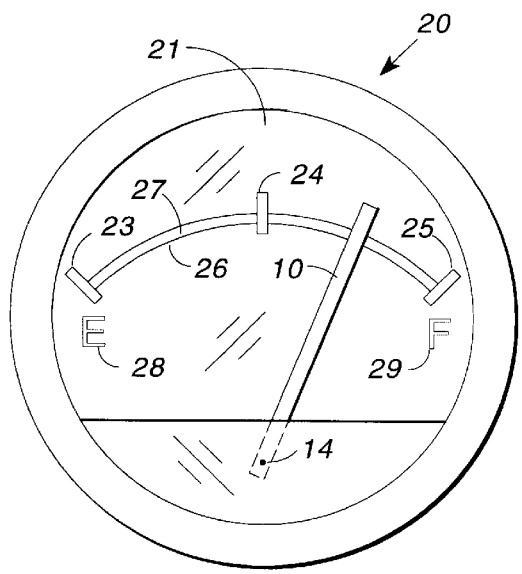
FIG. 2 illustrates a gauge having a movable pointer constructed in accordance with a preferred embodiment of the invention.

FIG. 2 illustrates pointer 10 as used in a gauge for indicating the fullness of a tank. Gauge 20 includes pointer 10 mounted on a suitable shaft (not shown) at pivot 14. Gauge 20 includes dial face 21 having indicia 23, 24, and 25 and arc 26 having "E" 28 and "F" 29 at the ends thereof. In a preferred embodiment of the invention, dial face 21 is an opaque mask overlying an EL lamp and graphics 23–25, 26, 28, and 29 are apertures in the mask permitting light from the underlying EL lamp 27 to pass through the mask. Pointer 10 overlies dial face 21 and is rotated by any suitable mechanism such as a stepper motor or galvanometer.

Figure 3:
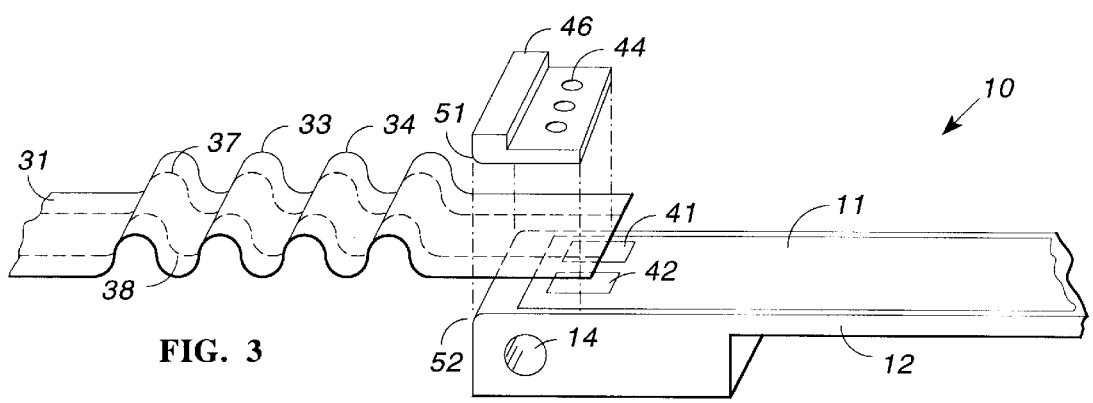
FIG. 3 illustrates electrical connection to the EL lamp in accordance with the invention.

FIG. 3 illustrates a preferred embodiment of the electrical connection to lamp 11 in which a compliant, corrugated lead is attached to the contact areas of lamp 11. In a preferred embodiment of the invention, lead 31 includes a plurality of folds or corrugations, such as folds 33 and 34, and is preferably a plastic ribbon, e.g. Mylar®, polyethylenenaphthalate (PEN) or polyethylene, approximately one mil thick on which a layer of copper is deposited to a thickness of about three microns. Parallel copper stripes 37 and 38 are deposited on the ribbon and extend longitudinally along the underside of the ribbon to provide electrical connection between lamp 11 and a source (not shown) of AC power.

Contact areas 41 and 42 on lamp 11 are brought into contact with stripes 37 and 38 and held in place by any suitable means such as ultrasonic bonding, solder, adhesive, or a mechanical crimp. In a preferred embodiment of the invention, ultrasonic bonding is used to attach the conductive stripes to the contact areas of the lamp and to bond the ribbon to the substrate of pointer 10. A plurality of blind holes, such as hole 44, is provided for a bonding head to attach cover 46 to substrate 12 and to bond stripes 37 and 38 to contact areas 41 and 42 respectively. Ultrasonic bonding provides a secure mechanical and electrical connection between lead 31 and pointer 10.

As pointer 10 rotates, lead 31 bends and the folds extend somewhat as the lead bends around the end of pointer 10. Because lead 31 is thin, plastic, and corrugated, it is very compliant, i.e. very little force is required to bend lead 31 or to unfold the corrugations. In addition, twisting the leads is avoided by having lead 31 extend longitudinally away from pointer 10. As illustrated in FIG. 3, edge 51 of cover 46 is rounded and edge 52 of substrate 12 is rounded to provide a relatively large (compared to the thickness of lead 31) minimum radius of curvature for the lead as pointer 10 rotates about pivot 14.

In one embodiment of the invention, lead 31 has a width of approximately 0.5 inches and a length of approximately 1.5 inches. A substrate constructed in accordance with the invention was a rectangular block of polycarbonate having a length of 3.3 inches, a depth of 0.2 inches, and a width of 0.13 inches. These dimensions are by way of example only and can be changed considerably to suit particular applications for the invention.

Figure 4:
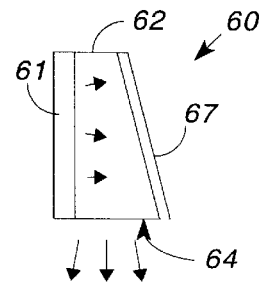
FIG. 4 is a top view of a pointer constructed in accordance with an alternative embodiment of the invention.

FIG. 4 is a top view of pointer 60 in which substrate 62 has a trapezoidal cross-section in which the longer of the parallel sides is the front. Front 64 is preferably roughened to enhance the brightness of pointer 60. If desired, reflective layer 67 covers the side of substrate 62 opposite lamp 61. As indicated by the arrows, light emitted by lamp 11 is redirected out the front of the pointer.

Figure 5:
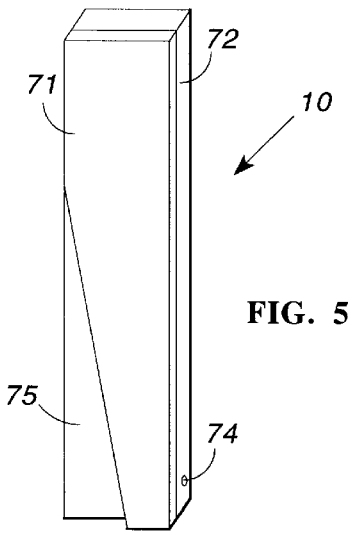
FIG. 5 is a side view of an alternative embodiment in which the pointer is brighter at one end than the other.

FIG. 5 is a side view of a pointer in which lamp 71 has an increasing width with distance from pivot 74. In this embodiment of the invention, pointer 70 increases in brightness with distance from pivot 74 due to the increasing area of lamp 71. The portion of substrate 72 not covered by lamp 71, indicated by reference numeral 75, is preferably covered with a reflective coating.

Figure 6:
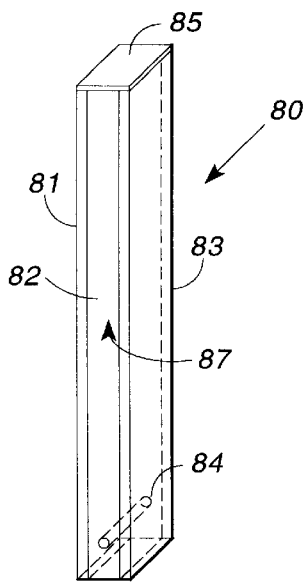
FIG. 6 illustrates a pointer having two EL lamps.

FIG. 6 illustrates an alternative embodiment of the invention in which pointer 80 includes two EL lamps. EL lamp 81 overlies the left side of substrate 82 and EL lamp 83 overlies the right side of substrate 82. Lamps 81 and 83 can be simultaneously lit or separately lit. If the lamps are separately controlled, ribbon 31 (FIG. 3) can include conductive stripes on both sides thereof, one side for each lamp. Alternatively, two ribbon leads or a split ribbon lead can be used. Front 87 is preferably roughened slightly for better light emission. Pointer 80 rotates about pivot 84 at the lower end of the pointer.

In tests of lamps on identical substrates, using two lamps on opposite sides of the substrate more than doubled the brightness of the pointer, particularly as the ratio of the width of the lamp to the width of the face increased. For example, in a pointer having a rectangular cross-section with adjacent sides in the ratio of 3:1 (the face having a width of 1), adding a second lamp increased the luminance of the pointer by about seven times (680%). In a pointer having a square cross-section (ratio of 1:1), adding a second lamp increased brightness about four times (380%). The sides not having a lamp were coated with silver paint.

Two lamps not only provide greater brightness but also enable variable brightness by using one, the other, or both lamps, which need not have the same brightness. Alternatively, lamp 81 is a different color from lamp 83, thereby providing an enhanced warning of abnormal readings by having the pointer change color.

In all of the embodiments of the invention, the reflectance of pointer 10 in bright ambient light is sufficient to produce a legible and distinct display. The slight roughening of the front of the pointers increases the scattering of light and produces a bright white pointer against a dark background.

The invention thus provides a moving pointer having an EL lamp in which the pointer is characterized by high luminosity in low ambient light and high reflectivity in high ambient light. The ribbon lead provides a high compliance, mechanically secure electrical connection to the EL lamp in the pointer.

Having thus described the invention, it will be apparent to those of skill in the art that various modifications can be made within the scope of the invention. For example, although gauge 20 is illustrated as having a pointer rotating 90°, gauges having a pointer rotating 270° or more can be made in accordance with the invention. Area 75 (FIG. 2) could be covered with a second lamp producing a different color from lamp 71. Lead 31 (FIG. 3) can be attached perpendicular to pointer 10, or at some other angle, in which case the lead would twist and unfold slightly as the pointer rotates. While illustrated as separate components, lamp 11 and lead 31 can be made on a common substrate, thereby simplifying the electrical connection to the pointer. Although the pointer is described as including a substrate having a polygonal cross-section, the sides of the substrate can be curved rather than straight.

What is claimed is:

1. A gauge including a dial and a movable pointer positioned adjacent the dial, wherein said pointer comprises:
    an elongated, translucent substrate having a first side, a second side, and a front side, wherein said front side faces away from said dial;
    a first EL lamp attached to said first side, said first EL lamp emitting light into said substrate from said first side and said light emanating from said front side;
    said substrate including a first end and a second end, wherein said first end includes a pivot about which said pointer can rotate in a plane substantially perpendicular to said first side.

2. The gauge as set forth in claim 1 wherein said substrate is polycarbonate.

3. The gauge as set forth in claim 1 wherein said substrate has a rectangular cross-section.

4. The gauge as set forth in claim 3 and further comprising a reflective coating on said second side.

5. The gauge as set forth in claim 1 wherein said lamp has a width across said first side and said width increases with distance from said pivot to increase the brightness of said pointer at said second end.

6. The gauge as set forth in claim 1 and further including a second EL lamp attached to said second side, said second EL lamp emitting light into said substrate from said second side and the light from said second EL lamp emanating from said front.

7. The gauge as set forth in claim 6 wherein said first EL lamp produces light of a different color from the light produced by said second EL lamp.

8. A gauge having a moving pointer wherein said pointer comprises:
    an elongated, translucent substrate having a first side and a second side;
    a first EL lamp attached to said first side;
    said substrate including a first end and a second end, wherein said first end includes a pivot about which said pointer can rotate in a plane approximately perpendicular to said first side; and
    a ribbon lead which extends from said pointer and which has conductive stripes electrically connected to said first EL lamp.

9. The gauge as set forth in claim 8 wherein said ribbon lead is corrugated to provide a compliant electrical connection to said first EL lamp.

10. The gauge as set forth in claim 8 wherein said ribbon lead includes a thin plastic ribbon having conductive stripes attached to said ribbon and extending longitudinally along said ribbbon.

11. The gauge as set forth in claim 8 wherein said ribbon lead extends longitudinally from said pointer.

12. The gauge as set forth in claim 1 wherein an area of said front side is less than an area of said first side.

* * * * *